United States Patent

Lotz

[15] 3,654,485

[45] Apr. 4, 1972

[54] A.C. SIGNAL LOGIC CIRCUIT

[72] Inventor: Alfred Lotz, Berlin, Germany

[73] Assignee: Licentia Patent-Verwaltugs-G.m.b.H., Frankfurt am Main, Germany

[22] Filed: June 29, 1970

[21] Appl. No.: 50,609

[30] Foreign Application Priority Data

| | | |
|---|---|---|
| June 28, 1969 | Germany | P 19 33 713.4 |
| Oct. 1, 1969 | Germany | P 19 50 330.1 |
| Mar. 18, 1970 | Germany | P 20 14 135.9 |
| Mar. 19, 1970 | Germany | P 20 14 110.0 |

[52] U.S. Cl. .....307/210, 307/214, 307/275, 331/112, 328/94

[51] Int. Cl. .....H03k 17/00

[58] Field of Search .....331/112, 149, 172; 307/210, 307/216, 275, 218, 214; 328/91, 93, 94

[56] References Cited

UNITED STATES PATENTS

| | | | |
|---|---|---|---|
| 3,193,781 | 7/1965 | Martner | 307/210 X |
| 3,445,783 | 5/1969 | Roos et al. | 331/112 X |
| 2,995,664 | 8/1961 | Deuitch | 307/218 |
| 2,901,640 | 8/1959 | Steinman | 307/216 |
| 3,231,758 | 1/1966 | Diamant | 307/218 |

*Primary Examiner*—Donald D. Forrer
*Assistant Examiner*—B. P. Davis
*Attorney*—Spencer & Kaye

[57] ABSTRACT

A logic circuit arrangement for dynamically coupling A.C. voltage type input signals which prevents the occurrence of an erroneous output signal in the event of a malfunction of the circuit. The input signals are fed into the circuit via separate input transformers, are rectified and are then utilized to control the pulse output voltage of a blocking oscillator circuit connected in common to all of the inputs.

10 Claims, 5 Drawing Figures

Inventor:
Alfred Lotz

BY Spencer & Kaye
ATTORNEYS.

Inventor:
Alfred Lotz
BY Spencer & Kaye
ATTORNEYS.

A.C. SIGNAL LOGIC CIRCUIT

BACKGROUND OF THE INVENTION

The present invention relates to a circuit arrangement for realizing logic functions. In particular, the present invention relates to a circuit for realizing logic functions utilizing A.C. voltage type, or dynamic, input and output signals.

Various types of logic circuit arrangements are known, e.g. AND gates, OR gates, etc., which operate with direct voltage signals corresponding to the binary characters "0" and "1".

In such known circuit arrangements, signals can appear at the output when there is a malfunction, e.g., due to defective components, interruptions in the line, etc., which signals correspond either to the binary value "0" (no voltage) or the binary value "1" (voltage). If such logic circuits are employed for control tasks, e.g. in the railroad signalling field, where the demand for assurance against faulty switching is very high, the occurrence of such a malfunction can lead to the transmission of erroneous signal terms. Moreover, errors caused, for example, by the malfunction of a component, can not be automatically recognized. The dependability of a control system utilizing such logic circuits is thus noticeably reduced.

Another type of known logic circuitry is the so-called A.C. logic wherein all of the logic circuits of the system are controlled by a centrally located clock pulse unit. The drawback of this type of logic processing is the dependence of the individual components or circuits of a control system on the central clock pulse signal for proper operation. When the clock pulse signal is missing, the entire control system is eliminated. A further drawback of such a logic system is that it is activated independently of the presence or absence of input signals to be linked, due to the continuously fed-in clock pulse signal, thus resulting in an unnecessary power consumption.

SUMMARY OF THE INVENTION

It is therefore the object of the present invention to provide a circuit arrangement for realizing logic functions which avoids the drawbacks of the above-mentioned logic systems, automatically recognizes errors and prevents the simultaneous emission of an erroneous output signal.

The above object is achieved, according to the present invention, by dynamically linking A.C. voltage type input signals by means of a logic circuit arrangement having a separate input transformer and a rectifier for each input signal and a common blocking oscillator circuit having a further transformer which is controlled by the input signals. The pulse voltage of the blocking oscillator is fed to the output of the logic circuit arrangement through an amplifier stage connected in the secondary circuit of the blocking oscillator transformer.

Such a circuit arrangement is not limited to the realization of a certain or particular logic linkage or configuration, but rather permits the construction of a complete system comprising all the necessary logic configuration types, such as AND OR NOT or MEMORY units. i.e.

The circuit arrangement according to the present invention has the particular advantage that, due to the transformers of the circuit, isolation exists between the input and the output potentials, and that this circuit will not be activated in its rest state as a result of the absence of its own supply voltage or of a clock pulse signal, i.e., under such conditions it remains passive.

DESCRIPTION OF THE PREFERRED EMBODIMENTS

Figure 1:
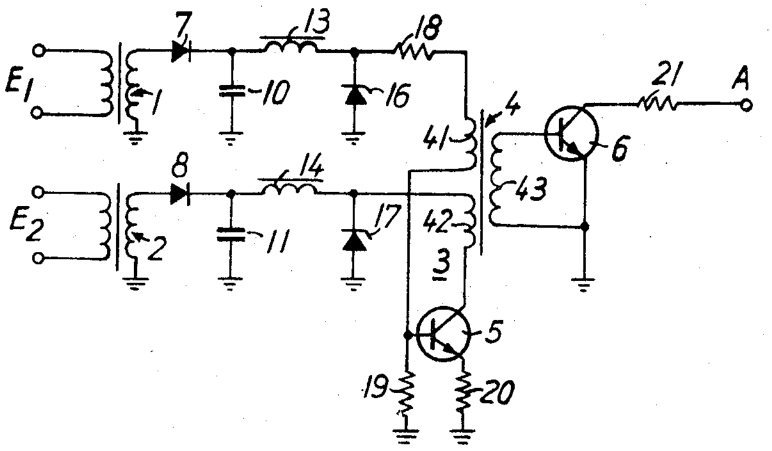
FIG. 1 is a schematic circuit diagram of an AND gate constructed according to the invention.

Referring now to the figures wherein the same reference numerals are used in all figures for corresponding components, FIG. 1 shows an AND gate wherein the two A.C. signals $E_1$ and $E_2$, which comprise the logic inputs to the circuit, are fed to the primary windings of separate transformers 1 and 2, respectively. The secondary of each of these transformers 1 and 2 is connected with a blocking oscillator 3 which comprises substantially the transformer 4, the transistor 5 and the resistors 18, 19 and 20.

In addition to the transformers 1 or 2, each signal input circuit contains a rectifier 7 or 8 and an inductance 13 or 14, which is connected in series, and a capacitor 10 or 11 and a Zener diode 16 or 17 which is connected in parallel with the secondary of the respective input transformer 1 or 2. Connected to the secondary winding 43 of the blocking oscillator transformer 4 is an amplifier stage, consisting of transistor 6 and resistor 21, whose output is connected to output terminal A of the logic circuit arrangement, i.e., the output of the AND gate.

The circuit arrangement of FIG. 1 realizes the function $E_1 \cdot E_2 = A$. That is, if A.C. voltage type input signals are simultaneously applied to input transformers 1 and 2 at inputs $E_1$ and $E_2$, an A.C. -voltage-type output signal will be provided at output A. The operation of the circuit is as follows:

The A.C. input signals appear at $E_1$ and $E_2$ and are rectified on the secondary side of transformers 1 and 2 by diodes 7 and 8 respectively, and the rectified signal is smoothed out by means of capacitors 10 and 11, respectively. The inductances 13 and 14 effect an additional smoothing of the rectified input signals appearing at $E_1$ and $E_2$, respectively. The voltage of the rectified input signals is in addition stabilized by means of the Zener diodes 16 and 17 connected to the leads to transformer 4 of the blocking oscillator 3. The signal from input $E_1$ is applied via resistor 18 and the primary winding 41 of transformer 4 to the base of transistor 5, whereas the signal from input $E_2$ furnishes the collector potential for transistor 5 via the primary winding 42 of transformer 4. The base and emitter of transistor 5 are connected to ground via resistors 19 and 20.

As a result of the voltage division by resistors 18 and 19 in the base circuit, the collector current flowing through transistor 5 is initially low. This current is quickly increased with the aid of the winding 41 in the base circuit of transistor 5 which acts as a feedback coil. The level of the feedback voltage determines the maximum possible collector current which is limited by resistor 20. When the maximum value of the collector current has been reached, i.e., the term $di_c/dt$ equals zero, voltage is no longer induced into the primary windings 41 and 42 of transformer 4 and transistor 5 is switched into the blocked state, producing a flyback voltage of opposite polarity. The process then periodically repeats itself, i.e. the transistor alternates periodically between "on" and "off" switching states, as long as input signals are present at both $E_1$ and $E_2$. The rectified signal voltage is thus converted into an almost rectangular pulse voltage and transmitted to the secondary winding 43 of transformer 4 from where it is fed, after amplification by transistor 6, to output A.

At the occurrence of any type of malfunction in the circuit arrangement, e.g. due to failure of components, short-circuit or interruption, no signal can be emitted from output A. When transistor 5 malfunctions, the oscillations of the blocking oscillator circuit can not be damped, and thus no flyback voltage is produced. The same applies for changes in the resistance value toward 0 or toward ∞, respectively. Additionally, at a short-circuit in the rectifier diodes 7 or 8 the transmitted input signals are strongly attenuated or damped by the high inductive reactance of the inductances 13 and 14, respectively, so that the blocking oscillator circuit oscillations can again not die out. In each of these types of malfunctions, since no flyback voltage is produced, the emission of an erroneous signal at the output A is prevented.

Figure 2:
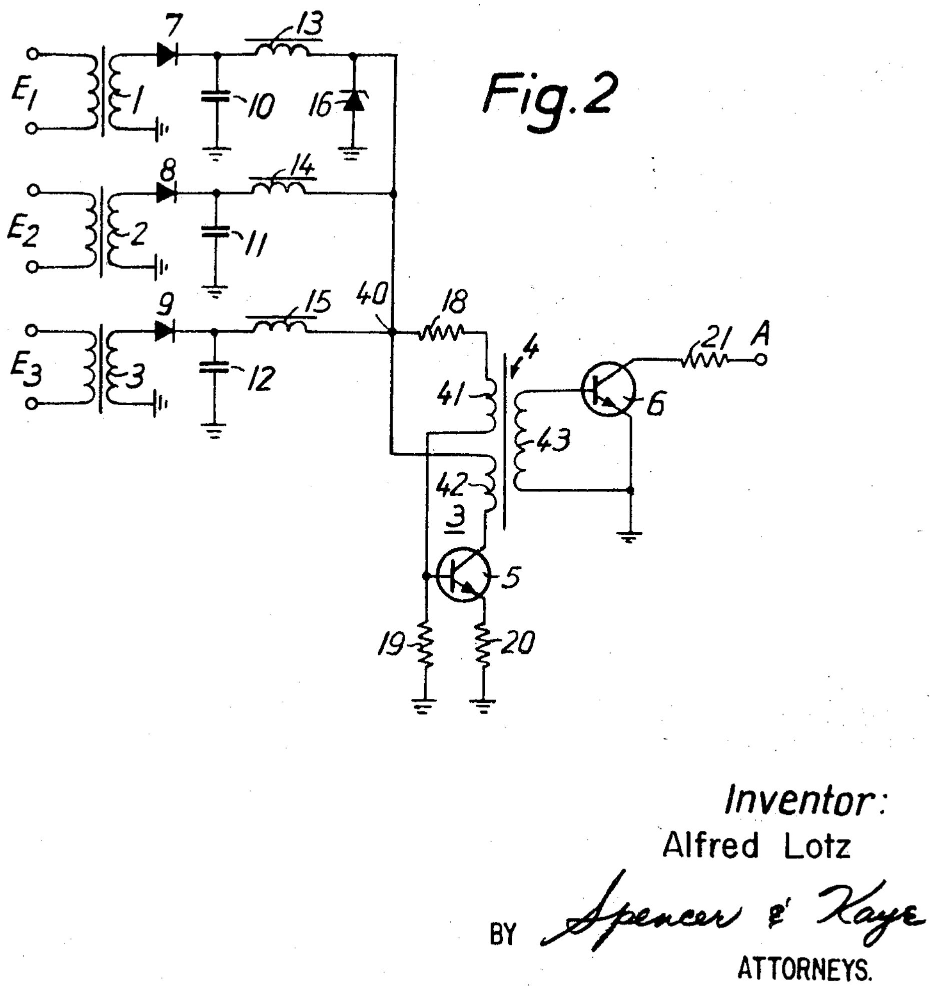
FIG. 2 is a schematic circuit diagram of an OR gate constructed according to the invention.

In the circuit arrangement shown in FIG. 2 which is an OR gate and realizes the function $E_1 + E_2 + E_3 = A$, the same reference numerals are used for components corresponding to those of FIG. 1.

In order to realize this function, an additional input circuit consisting of input transformer 30, diode rectifier 9, capacitor 12 and inductor 15 is provided. The mode of operation of this circuit corresponds in the most significant aspects to that shown in FIG. 1. When an input signal is switched through to output *A*, it is here only necessary, in contradistinction to the circuit of FIG. 1, that at least one of the inputs $E_1$, $E_2$ or $E_3$ has a signal applied thereto. Accordingly, in this circuit arrangement all of the input circuits are connected to a common point 40 which in turn is directly connected in series with the primary winding 42 and in series with the winding 41 via a resistor 18. Thus, a signal applied to any of the inputs $E_1$, $E_2$ or $E_3$ will cause the blocking oscillator to operate and produce the flyback voltage. In this embodiment, the inductances 13, 14 and 15 additionally serve to decouple the inputs $E_1$, $E_2$ and $E_3$ from one another.

Figure 3:
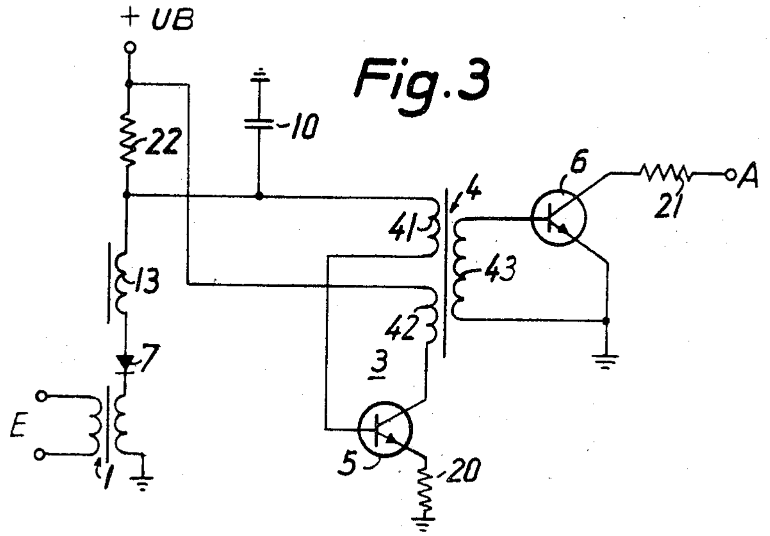
FIG. 3 is a schematic circuit diagram of a NOT gate constructed according to the invention.

FIG. 3 shows the structure of a NOT unit or gate according to the invention. The function to be realized is thus $E=\overline{A}$ and accordingly, only one input is provided. The NOT unit negates the output signal, i.e. when the signal at input E is a "1" signal, a "0" signal appears at output *A* and vice versa. The unit is used to construct switching stages with inverting outputs which can be realized by the connection of an AND GATE. With the aid of these switching stages, failsafe coincidence and non-coincidence logic stages can be built up.

In FIG. 3, *E* is the input and *A* the output of the NOT gate. Input *E* leads to the primary of the input transformer 1, which again has the diode 7, inductance 13 and capacitor 10, which serve to rectify and smooth the transmitted input pulse voltages, connected in its secondary circuit. In this embodiment, however, a resistor 22 which is connected in series with an operating voltage source $+U_B$ is also connected in the secondary circuit of transformer 1, so that the resistor 20 and the diode 7 form a voltage divider. The secondary circuit of the transformer 1 thus furnishes all of the control voltages for the blocking oscillator circuit 3 comprising transistor 5, transformer 4 with primary windings 41 and 42 and secondary winding 43 and resistor 20. The amplifier stage comprising transistor 6 and resistor 21 is again connected in the secondary circuit of the blocking oscillator transformer 4 and leads to the output A of the circuit.

This circuit operates as follows. If input *E* is not actuated, the base of transistor 5 receives a positive bias because of the voltage division by resistor 22 and diode 7. The application of the positive bias causes the collector current through transistor 5 to initially be low. This collector current is quickly increased with the aid of feedback winding 41 in the base circuit of transistor 5. The blocking oscillator is thus excited and operates substantially in the same manner as described in connection with FIG. 1. Transistor 5 thus periodically alternates between switching states "on" and "off" or "pass" and "-Block", this produces an alternating pulse voltage in the primary winding 42 of transformer 4 which is generally rectangular and is induced into secondary winding 43. The voltages emitted from the secondary winding 43 of transformer 4 are amplified by the transistor 6 and switched through to output *A*.

Conversely, if a "1" signal is present at input *E*, the base of transistor 5 is held in the negative voltage range due to the action of diode 7. The oscillating stage ceases to operate; and a signal representing a "0" is emitted at output *A*.

When using such a safe NOT unit in failsafe circuits, care must be taken that the failsafeness is provided only when input *E* of the NOT gate employed is linked or coupled to at least one input of a further logic module (other than a NOT GATE). This measure permits monitoring of the input circuit of the NOT gate since it forms a loop or loops with other safe units.

Figures 4, 5:
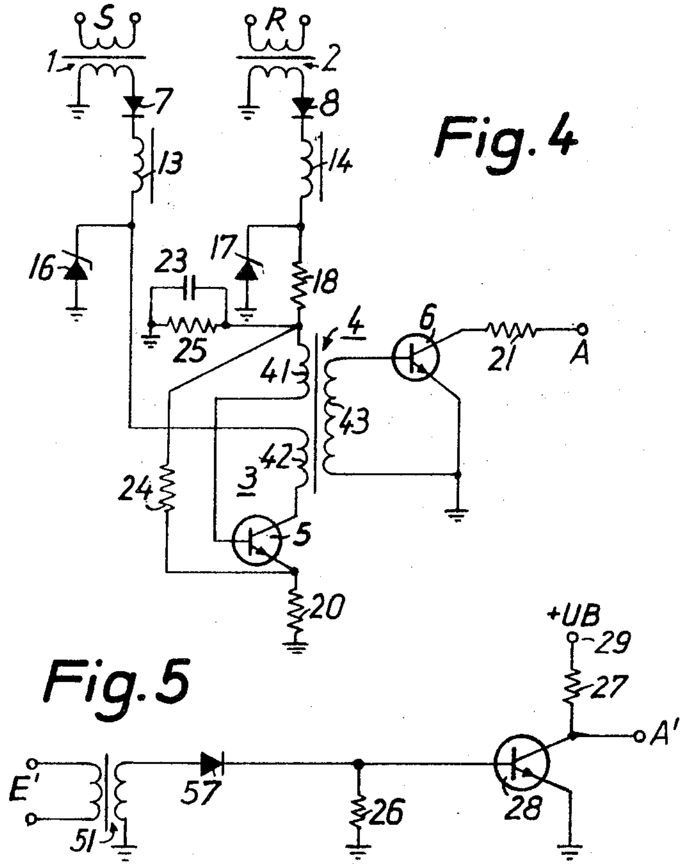
FIG. 4 is a schematic circuit diagram of a MEMORY unit constructed according to the invention.
FIG. 5 is a logic circuit arrangement for adapting the A.C. or dynamic output signals of the other embodiments of the invention for use with D.C. coupled logic systems.

FIG. 4 shows a MEMORY unit having setting priority. In FIG. 4, S and R represent the set and reset inputs of the MEMORY unit. Both inputs are provided with separate input transformers 1 and 2. Diodes 7, 8 and inductances 13, 14 are connected in the secondary circuits of these transformers and serve to rectify and smooth the transmitted input pulse voltages. The inductances 13, 14 in addition to further smoothing the input voltage, also serve to protect the blocking oscillator 3 against short circuits in diodes 7, 8 due to their high inductive input reactance. The Zener diodes 16 and 17 also connected to these secondary circuits stabilize the supply voltage of the passively operating blocking oscillator circuit 3 which consists of transistor 5, transformer 4 with primary windings 41 and 42 and secondary winding 43, capacitor 23 and resistors 24, 18, 25, and 20. The amplifier stage consisting of transistor 6 and resistor 21 is connected to the secondary winding 43 of blocking oscillator transformer 4 and leads to output *A* of the circuit arrangement.

The MEMORY unit operates as follows.

This circuit is designed as a safety memory so that output *A* takes on binary value "0" when control signal "0" appears at its set input S. Each internal or external malfunction (defective components, interruptions in the lines) causes the memory to flip into its safe set position where output *A* continuously emits a "0" signal. If the memory receives a "1" signal at its reset input R and set input S has a "1" signal, the memory output A flips into the erase position and a "1" signal appears at output A (rest current operation). In general, if both inputs S and R receive "1" signals, the oscillator stage operates. The signal from input R acts, via resistors 18 and 25 and the primary winding 41 of transformer 4, on the base of transistor 5 whereas the signal from input S furnishes the collector potential for transistor 5 via the primary winding 42 of transformer 4. Due to the voltage division by resistors 18, 25 in the base circuit, the collector current flowing through transistor 5 is low at first. This current is quickly increased with the aid of winding 41 in the base circuit of transistor 5 which acts as a feedback coil. The further operation of the blocking oscillator is the same as described in connection with FIG. 1. A feedback path containing the feedback resistor 24 serves to return the signal from the collector circuit to the base circuit of transistor 5. Thus, the supply voltage for the base circuit of the blocking oscillator stage 3 is maintained. The following truth table shows the different conditions between output *A*, set input S and reset input R:

| R | S | $A_{t0}$ | $A_{t1}$ |
|---|---|---|---|
| 0 | 0 | 0 | 0 |
| 0 | 1 | 0 | 0 |
| 1 | 0 | 0 | 0 |
| 1 | 1 | 0 | 1 |
| 0 | 0 | 1 | 0 |
| 0 | 1 | 1 | 1 |
| 1 | 0 | 1 | 0 |
| 1 | 1 | 1 | 1 |

= memory output at the moment under consideration; and $A_{t1}$ = memory output appearing after the delay interval of the memory.

In order to logic type elements according to the invention to be utilized in conjunction with D.C. coupled logic systems which are not failsafe in the sense of the definition described above, adapting circuits are required which convert the dynamic output signals of the failsafe logic to static signals for further processing with isolated potentials. Such an adapting circuit is shown in FIG. 5.

In FIG. 5, E' is the input and A' the output of the adaptation circuit. Input E' leads to an input transformer 51. A diode 57, which serves to rectify the transmitted input pulse voltages, is connected in the secondary circuit of the transformer 51 and a negating stage, consisting of resistors 26 and 27 and transistor 28 is connected to the diode 57. The collector supply voltage $+U_B$ for the transistor 28 is supplied at terminal 29.

The adaptation circuit realizes the following logic:

$E'=\overline{A'}$ or $\overline{E'}=A'$, respectively.

If input *E'* is provided with a dynamic input signal, i.e., an output signal from one of the circuits of FIGS. 1–4, a static "0" signal appears at output A'. If input $E$ is controlled by a "0" signal or the input is not connected, output $A'$ emits a static "1" signal. However, this unit no longer operates in a failsafe manner. When a malfunction occurs in the circuit (defective components), the output may take up any possible state ("1" or "0" signal).

It will be understood that the above description of the present invention is susceptible to various modifications, changes and adaptations and the same are intended to be comprehended within the meaning and range of equivalents of the appended claims.

I claim:

1. A circuit arrangement for realizing logic functions by means of the dynamic linkage of alternating voltage type binary input signals comprising:
- at least one input circuit for said circuit arrangement with each input including a separate input transformer and a rectifier connected to the secondary of said input transformer;
- a single blocking oscillator circuit including a transformer, means for connecting the voltage appearing at the output of each of said input circuits to said blocking oscillator circuit as the supply and control voltages thereof whereby the pulse voltage oscillations of said blocking oscillator circuit are controlled by the rectified voltages resulting from A.C. input signals applied to said input circuits;
- a single output terminal for said circuit arrangement; and
- an amplifier stage connected to the output secondary winding of said blocking oscillator transformer for feeding the pulse voltage output of said blocking oscillator to said output terminal.

2. The circuit arrangement as defined in claim 1 wherein said circuit arrangement includes a plurality of said input circuits.

3. The circuit arrangement as defined in claim 1 wherein each of said input circuits includes an inductance connected in series with said rectifier.

4. The circuit arrangement as defined in claim 1 wherein said blocking oscillator transformer has a pair of primary windings and wherein said blocking oscillator circuit further includes a transistor having a first of said primary windings connected in its collector circuit and the other of said primary windings connected to its base.

5. The circuit arrangement as defined in claim 4 wherein said circuit arrangement has two of said input circuits, one of which is connected in series with said first primary winding and the other of which is connected in series with said other primary winding, whereby said circuit arrangement is an AND gate.

6. The circuit arrangement as defined in claim 4 wherein said circuit arrangement has a plurality of said input circuits, the outputs of which are connected to a common point and in series with said first primary winding; said common terminal being further connected to said base of said transistor via a resistor and said other primary winding, whereby said circuit arrangement is an OR gate.

7. A circuit arrangement for realizing logic functions by means of the dynamic linkage of alternating voltage type binary input signals comprising:
- a single input circuit for said circuit arrangement including an input transformer, a rectifier connected to the secondary of said input transformer, a source of D.C. potential, and a voltage divider, consisting of a resistor and said rectifier, connected in series with said source of potential and said secondary winding of said input transformer;
- a single blocking oscillator circuit including a transformer having a pair of primary windings and a transistor having a first of said primary windings connected in its collector circuit and the other of said primary windings connected to its base, the control voltages for controlling said blocking oscillator circuit being taken from said voltage divider by connecting said primary windings of said blocking oscillator transformer thereto in a manner whereby the pulse voltage oscillations of said blocking oscillator are controlled by the rectified A.C. input signal applied to said input circuit whereby said circuit arrangement is a NOT circuit;
- a single output terminal for said circuit arrangement; and
- an amplifier stage connected to the output secondary winding of said blocking oscillator transformer for feeding the pulse voltage output of said blocking oscillator to said output terminal.

8. The circuit arrangement as defined in claim 7 wherein said first primary winding of said blocking oscillator transformer is connected to said source of D.C. potential and said other primary winding is connected between the base of said transistor and the junction of said resistor and said rectifier.

9. The circuit arrangement as defined in claim 4 wherein said circuit arrangement has two of said input circuits, one of which is connected in series with said first primary winding and the other of which is connected in series with said other primary winding; and wherein said circuit arrangement further includes means for feeding back the collector circuit voltage to the base circuit of said transistor in order to maintain the supply voltage thereto, whereby said circuit arrangement operates as a memory circuit with said two input circuits comprising set and reset inputs respectively.

10. The circuit arrangement as defined in claim 1 including further circuit means for adapting the dynamic output signals from said circuit arrangement for use by D.C. coupled logic, said further circuit means comprising: a transformer having its input connected to said output terminal and its secondary winding connected in series with a rectifier and the control electrode of a transistor-resistor negating stage, whereby said further circuit arrangement converts the dynamic input signals thereto to static signals at the output of said negating transistor-resistor stage.

* * * * *